H. BRYANT.
GAME-COUNTER.

No. 174,471. Patented March 7, 1876.

Sancho-Pedro Counter.

The tally-man has Nº 1, the next player at his left takes Nº 2, and so on. The red lines minus.

Four pins are used for each player; one to play the game, one to score and show the average, and two to record the games.

Score average Table, and number of games won. — won. GAMES lost.

UNITED STATES PATENT OFFICE.

HENRY BRYANT, OF HARTFORD, CONNECTICUT.

IMPROVEMENT IN GAME-COUNTERS.

Specification forming part of Letters Patent No. 174,471, dated March 7, 1876; application filed June 10, 1875.

*To all whom it may concern:*

Be it known that I, HENRY BRYANT, of Hartford, county of Hartford and State of Connecticut, have invented a certain table, or improvement in the method of keeping the count of the game called "Sancho Pedro," of which the following is a specification:

The first part of my invention consists of a table of squares, A, formed of horizontal and vertical lines, each square inclosing a dot, B, or place to stick a pin. The vertical lines embrace seventeen spaces; the horizontal fifty or more spaces.

Second, in the first vertical column of squares, C, I place figures, beginning at the top, from one to eight, inclusive; then, skipping the ninth horizontal line of the squares D, I continue the vertical column of figures again from one to eight, inclusive, or duplicated, as at E.

Third, in the ninth line, D, of horizontal spaces, I place figures F, skipping the first square, and counting from one to fifty or more against these figures; and below them, in section marked K, are placed the pins on the dots above mentioned, to count the points in the game on.

Fourth, I draw eight colored or red lines, G, (indicated on the drawing by hatched lines) opposite to the eight lower figures in column of figures at the left extending horizontally through the squares of section K of the table, and in each square on the line G I place a dot for the pin, and the pin standing on this colored or red line denotes minus, or so many points lost as the figures against the pin would denote by the vertical column of squares—in other words, called " set back."

Fifth, the eighth column (horizontal) of section H are used to record who went out first, second, or third, in the game played, and the pins are replaced in the square of said section, corresponding to rates of winning, until all the games of the evening are played, and then their average is counted as the pins stand against the line of horizontal figures.

Sixth, the divisions in the upper corner at the right, I and Q, record the number of games lost and won by each player.

Seventh, the dots in the vertical column of figures at the left, J, are places to place the pins at the beginning of a game.

What I claim as my invention is—

The game-counter, consisting of a table inscribed with lines inclosing squares A A, and divided in sections H, K, I, and Q, the section K being crossed by the bands G, substantially as shown and described, and for the purposes hereinbefore set forth.

HENRY BRYANT.

Witnesses:
R. S. DE LAMATER,
CHAS. H. HALL.